Patented Aug. 22, 1933

1,923,094

UNITED STATES PATENT OFFICE 1,923,094

PROCESS AND PRODUCTS PERTAINING TO TREATMENT OF METALLIC OXY-COMPOUNDS

Leslie G. Jenness, Brooklyn, N. Y., assignor to Intermetal Corporation, New York, N. Y., a Corporation of Delaware No Drawing. Application January 23, 1931, Serial No. 510,774, and in Great Britain August 18, 1930

10 Claims. (Cl. 75—67)

My present invention relates to process and products pertaining to the treatment of metallic oxy compounds including oxy ores, and is an improvement on the invention of my United States Patent No. 1,834,622, entitled Reduction of metals from ores, dated December 1, 1931. My present improvement is based upon discoveries relating to the best composition for the chlorine and sulphur chloride reagent used in the process and the best way of preparing it to produce the end-products most efficiently. The end-products which the process is capable of producing comprise double chlorides of the several metals with sulphur, and single metallic chlorides or oxy chlorides. The double chlorides in some instances are oxy chlorides of the metals, instead of single chlorides, combined with sulphur chloride. Some of these end-products in specific instances have proven to be new compounds never before produced so far as I can ascertain.

Accordingly, my present patent is directed to the improved process pertaining to the treatment of metallic oxy compounds, the improved reagent and the method of making it for use with the process of the main patent; and to the new end-products.

There are several chlorides of sulphur,—the lower or monochloride ($S_2Cl_2$) boiling at 138° C.; and the higher chlorides comprising the dichloride ($SCl_2$) boiling at 59° C.; and the tetrachloride ($SCl_4$) which, except in the presence of free chlorine, decomposes at 20° C. The monochloride is formed when chlorine is passed through or over heated sulphur or metallic sulphides and it tends to form in increasing quantity with the increase in the temperature of its preparation. Thus, it is formed with more or less purity at any temperature as high as 200° to 300° C. or higher. When chlorine is passed over sulphur heated to 100° C., a large proportion of the resulting sulphur chlorides consists of the monochloride. In the illustrative example given in the main patent for the application of the process to tantalum and columbium oxides, I prescribe sulphur dichloride and chlorine for the reagent. My researches have confirmed the fact that the dichloride is the most effective of the sulphur chlorides for my process; that it is the dichloride which reduces the metallic oxides of the ore or other material as a preliminary to chlorination by the free chlorine, and that it is the dichloride which then forms the double chloride. On the other hand, this must not be taken as excluding the tetrachloride which also I have found to be effective in my process. On the other hand, whatever sulphur monochloride there may be in my reagent is a mere diluent and has scarcely any effect in reducing the oxides or other metallic oxy compounds, or any other useful chemical effect and might better be absent. Accordingly, I prepare the chlorine and sulphur chloride reagent in a special way hereinafter described so as to make it consist, so far as practical, of a mixture rich in the higher sulphur chlorides, especially the dichloride, a further object being preferably to minimize the presence of the monochloride. By working the process with this reagent, the yield, efficiency and purity are considerably increased.

In the main patent I do not describe the best proportions of sulphur chloride to chlorine, but these I herein describe. The most efficient proportions for the ingredients of the reagent to produce double chlorides consist of enough sulphur higher chloride to reduce or deoxidize the metallic oxy material and enough in addition to form the double chloride end-product with the metallic chloride as soon as the latter is formed by the free chlorine in the reagent; and enough free chlorine to be able to do all of the chlorinating without requiring the sulphur chloride ingredient to do any of it.

Of course, the excess amount of sulphur higher chloride that is provided as aforesaid to form the double chloride may vary with the material under treatment in accordance with the variation in the formulas of the end-products. This will be evident by comparing the formulas of the tantalum, titanium, columbium and vanadium double chlorides which I have ascertained and believe to be substantially as follows according to present data: $4TaCl_5.3SCl_2$; $TiCl_4.SCl_2$; $2CbCl_5.SCl_2$; and $VOCl_3.SCl_2$. For this reason I provide more than enough sulphur higher chloride in the reagent to do all the reducing required and to do all of the necessary double chloride formation; and I also provide more than enough free chlorine to do all the chlorinating of the metallic constituent without requiring any of it to be done by the sulphur chloride. In other words, the reagent in its preferred form may be described as comprising at least sufficient sulphur dichloride to do all of the reducing necessary and all of the double chloride formation necessary; and at least sufficient chlorine to do all the chlorinating necessary of the reduced metallic constituents. Beyond this the reagent may comprise additional free chlorine and additional sulphur dichloride without doing any harm except for the economic waste, although in practical operation there will almost inevitably be some excess of these ingredients which will be suitably recovered at the end of the process and returned to the beginning for reuse, or will be otherwise employed. Also, sulphur tetrachloride may be comprised in the reagent. The same is true of sulphur monochloride only up to a certain extent but beyond that it is detrimental because if present in too large a quantity it will condense with the end-products and, to the extent that it does so, will impair the practical value of the process.

Thus, the monochloride becomes excessive when the reagent is prepared by passing chlorine through sulphur heated to temperatures at all approaching 100° C. or higher, and in use tends seriously to contaminate the end-product.

There are a number of methods of preparing the chlorine and sulphur dichloride reagent which will have at least enough sulphur dichloride to effect reduction and enough additional to form the double chloride, and at least enough free chlorine to do all the chlorination, and without enough sulphur monochloride to contaminate the end-products materially or injuriously. Moreover, it will be understood that the reagent when produced will be passed through or over the oxy ore or metallic oxide or other kind of metallic oxy compound contained in a suitable furnace wherein the material is heated to a suitable temperature peculiar to the given material and necessary to the reduction of the given material, its chlorination and volatilization as double or oxy chloride referred to generally in the main patent.

Thus, to produce the reagent I may bubble chlorine through sulphur or sulphur chloride at any relatively low temperature up to preferably not over about 60° C., at which temperature so much sulphur monochloride begins to be formed that the purity of the end-products tends to suffer. Still more specifically, I prefer to bubble the chlorine through or over the sulphur or sulphur chloride at a low temperature, for example, room temperature 25° C. By so doing I form the higher chlorides, principally sulphur dichloride, with minimum formation of monochloride, if any. Then, having converted the sulphur substantially to dichloride, I raise the temperature to about 50° C., at the same time continuing to bubble the chlorine through it. The derived gaseous mixture is then passed directly into the furnace containing the oxy material and constitutes the reagent composed substantially of free chlorine and the higher sulphur chloride, notably the dichloride, and with so little monochloride, if any, that it is harmless. The reagent so prepared gives maximum yield of end-product per unit time and the end-product has maximum purity or freedom from contamination by monochloride or free sulphur.

The end-products formed by the process are often double chlorides made up of the chloride or oxy chloride of the metal combined with sulphur chloride. Moreover, many of the double chlorides which I have formed in this way are new compounds never before produced or described in the literature as far as I have been able to ascertain. These double chlorides exhibit characteristics differing markedly from those of the corresponding normal or single metallic chlorides or oxy chlorides.

These double chlorides produceable by my process have various formulas of which above I have given examples in the case of the tantalum, titanium, columbium and vanadium double chlorides. The application of the process to oxides and oxy compounds of tin, chromium, beryllium, aluminum, molybdenum and other metallic elements also produce double chlorides of the given metals with sulphur.

When the process is applied to a tungsten oxy compound, the tungsten end-product may be made to consist, depending upon the furnace temperature, of a tungsten oxy chloride having the probable formula $WOCl_3$ or of a double chloride of said oxy chloride. This is also true of other metals. The tungsten oxy chloride may be recovered either by volatilizing it from the furnace and then condensing it, or by keeping the furnace temperature below the volatilization point of the oxy chloride and then leaching it out of the material as indicated in my Patent No. 1,863,599 dated January 21, 1932. This same leaching method of recovery of the end-products may also be used when advantageous to recover double chloride end-products from the furnace material where the temperature has been regulated to form the product but not high enough to volatilize it.

The generic properties of the double chlorides include the following:

(1) All those herein named, except the vanadium double chloride which is a liquid, are solids at ordinary temperatures although the tin double chloride is so volatile at room temperature that it tends to blow the stopper out of a bottle containing it.

(2) All volatilize at temperatures which differ considerably from the single chlorides of the same metals. Thus, columbium double chloride is formed by the process from columbium oxide and volatilizes at 200° C., whereas the boiling point of the normal columbium chloride ($CbCl_5$) is 240° C. Tin double chloride volatilizes at room temperature, whereas stannic chloride ($SnCl_4$), boils at 114° C. In all, these double chlorides volatilize at lower temperatures than the corresponding single chlorides.

(3) Most of them are soluble in cold water, whereas the ordinary single chlorides of these metals rapidly decompose in water such as $TiCl_4$, $CbCl_5$, $TaCl_5$, $SnCl_4$. An exception is the tin double chloride produced by my process which also rapidly decomposes in cold water.

The advantages of these products are manifold and include the possibility of producing therefrom a large variety of other compounds and the possibility of using them and the derived products usefully in many ways in the arts, all of which being additional to the use of the double chlorides and other end-products to make selective separation of the metallic elements easier from their ores and other materials.

Neither chlorine alone nor carbon tetrachloride, nor a mixture of these, is a practical substitute for my reagent. Tests show that they have a reduction and chlorination efficiency of only a very small fraction of that of my reagent. Further, that they produce when used only the ordinary chlorides of the metals. Thus, when applied to ilmenite, an iron-titanium oxy ore, they produce liquid titanium chloride in the condensate instead of my new product which is solid double chloride of titanium with sulphur. Also, when the chlorine and carbon tetrachloride reagent is prepared by bubbling the chlorine through the carbon tetrachloride heated at 50° C., the carbon tetrachloride condenses in abundant quantities along with the titanium chloride and must be separated therefrom by fractional distillation. Moreover, when these reagents are used, the material must be heated to much higher temperatures than those required in my process, and in fact must be heated to such high temperatures to effect the chlorination in the case of ilmenite and like materials, that the resultant chlorides distil substantially all together and must be fractionally separated out of the condensate, assuming that it be possible to separate them at all in this way.

In the prior art, either chlorine or sulphur monochloride or a mixture of the two have been used for the chlorination of sulphide ores to produce the normal or single chlorides of the given metals, such as zinc, lead, copper, iron chlorides; but this is very different from my process which applies to metallic oxy compounds, such as oxides, carbonates, silicates, etc., as distinguished from sulphides. Furthermore, sulphur monochloride, whether alone or mixed with chlorine, has substantially no reducing action on an oxy ore at the low temperatures used in my process. Sulphur monochloride is ineffective in my process. It will not reduce oxy compounds except to a trivial extent, and it will not form the double chlorides.

The following figures are the result of actual tests of the named reagents in volatilizing titanium from ilmenite, the furnace temperature and other conditions being the same. Chlorine alone passed over the ore yielded no volatilization of titanium. A mixture of chlorine and sulphur monochloride yielded .0028 parts. Pure sulphur monochloride yielded a slightly higher percentage, namely, .0355 parts. My own reagent consisting of sulphur dichloride and chlorine volatilized 6.71 parts, thus showing its great superiority over chlorine alone, sulphur monochloride alone, or a mixture of the two.

Sulphur monochloride when used alone or in admixture with chlorine, wherein there is too little chlorine to do all the chlorination, has the further disadvantage that it tends to produce free sulphur to clog the furnace material and to condense with and contaminate the end-product. The fact that I maintain an excess of free chlorine so that there is always enough to do all the chlorinating, prevents the sulphur chloride from being called upon to do any of the chlorinating which it otherwise would do with incidental freeing of sulphur to the detriment of the process.

Thus, some of the outstanding features of my invention may be summarized as follows:

(1) That sulphur dichloride possesses a marked reducing action on metallic oxy compounds, whereas the monochloride does not.

(2) That the combined reagent comprising sulphur higher chloride and chlorine is a most efficient reagent for effecting the reduction and chlorination of said material at comparatively low temperatures; and that the excess of sulphur higher chloride in many cases forms a volatile double chloride end-product having characteristics enabling it to be readily recovered separately from the other end-products.

(3) That if there be any sulphur monochloride in the reagent, there should not be enough to cause it to condense with and contaminate the end-product, which is its tendency.

(4) That the best reagent is one made by passing chlorine through sulphur or sulphur chloride to form substantially all together the higher chlorides, especially the dichloride, with a minimum of monochloride, said sulphur chloride then being heated with the chlorine continuing to be passed through it to a temperature of about 50° C. or thereabouts, so as to freely vaporize the sulphur dichloride whereby the reagent delivered to the suitably heated oxy material in the furnace is especially rich in sulphur dichloride.

(5) That there must be at least enough chlorine in the reagent to do all of the chlorinating of the reduced metallic constituent, because otherwise this will be done by the sulphur chloride with resulting deposition of sulphur.

(6) That many of the end-products produced by the application of the process to various oxy ores or materials are new.

What I claim is:

1. The process of treating metallic oxy compounds which comprises passing chlorine through sulphur chloride consisting mainly of the dichloride or higher chloride to the substantial exclusion of the lower or monochloride, said sulphur chloride through which the chlorine is passed as aforesaid then being heated approximately to a temperature at or below the boiling point of the sulphur dichloride; and then delivering said chlorine and the vaporized sulphur chloride over the suitably heated compound.

2. Process of treating metallic oxy compounds which comprises passing chlorine through sulphur dichloride heated approximately to a temperature at or below the boiling point of sulphur dichloride; and then delivering said chlorine and the vaporized sulphur chloride over the suitably heated compound.

3. The process of treating metallic oxy compounds which comprises passing chlorine through sulphur chloride consisting mainly of the dichloride or higher chloride to the substantial exclusion of the lower or monochloride, said sulphur chloride through which the chlorine is passed as aforesaid being heated to about 40° to 50° C.; and then delivering said chlorine and the vaporized sulphur chloride over the suitably heated compound.

4. The process of forming a reagent for reducing and chlorinating oxy-ores which comprises passing chlorine through sulphur at a relatively low temperature, approximately room temperature, thereby substantially converting the sulphur into sulphur dichloride, and then passing more chlorine through the product of reaction at approximately 50° C. and recovering the reagent in gaseous form.

5. A reagent comprising a mixture of sulphur dichloride and free chlorine substantially free from contamination with lower chlorides of sulphur, the said dichloride being present in amount in excess of that required to reduce a given metallic oxy-ore, said chlorine being present in amount sufficient to chlorinate the reduced metallic compound into a metallic chloride, and said excess of said dichloride being capable of forming from said metallic chloride a double chloride comprising the metal chloride and sulphur dichloride.

6. A composition of matter consisting of a double chloride comprising sulphur dichloride and the chloride of one of the groups of metals comprising tantalum, titanium, columbium, vanadium, chromium, beryllium, molybdenum, tungsten, tin.

7. A composition of matter consisting of a double chloride comprising sulphur dichloride and the chloride of a metal selected from the group comprising tantalum, tin, titanium, columbium, vanadium, chromium, beryllium, molybdenum, tungsten, said double chloride having a volatilization point lower than that of the corresponding single chloride of sulphur with the metal.

8. A composition of matter consisting of a double chloride comprising sulphur dichloride and the chloride of a metal selected from the group comprising tantalum, titanium, columbium, vanadium, chromium, beryllium, molybdenum, tungsten, said double chloride having a volatilization point lower than that of the corresponding single chloride of sulphur with the metal, and being soluble in water.

9. The double chloride comprising sulphur dichloride and the chloride of a metal selected from the group comprising tantalum, titanium, columbium, vanadium, chromium, beryllium, molybdenum, tungsten, tin.

10. The process of treating metallic oxycompounds which comprises passing chlorine through sulphur chloride at approximately room temperature (25° C.), thereby forming higher chlorides of sulphur, principally sulphur dichloride, with a minimum formation of sulphur monochloride, then heating the mixture to a temperature approximately at or below the boiling point of the sulphur dichloride while continuing to pass chlorine through the said mixture, and then delivering the mixed product over the suitably heated compound.

LESLIE G. JENNESS.